(12) United States Patent
Matsumoto

(10) Patent No.: US 10,879,666 B2
(45) Date of Patent: Dec. 29, 2020

(54) OPTICAL FIBER AND FIBER LASER

(71) Applicant: FUJIKURA LTD., Tokyo (JP)

(72) Inventor: Ryokichi Matsumoto, Sakura (JP)

(73) Assignee: FUJIKURA LTD., Tokyo (JP)

( * ) Notice: Subject to any disclaimer, the term of this patent is extended or adjusted under 35 U.S.C. 154(b) by 0 days.

(21) Appl. No.: 16/337,508

(22) PCT Filed: Mar. 3, 2017

(86) PCT No.: PCT/JP2017/008468
§ 371 (c)(1),
(2) Date: Mar. 28, 2019

(87) PCT Pub. No.: WO2018/066148
PCT Pub. Date: Apr. 12, 2018

(65) Prior Publication Data
US 2019/0229489 A1      Jul. 25, 2019

(30) Foreign Application Priority Data

Oct. 4, 2016   (JP) .................... 2016-196649

(51) Int. Cl.
*H01S 3/094*   (2006.01)
*G02B 6/28*    (2006.01)
(Continued)

(52) U.S. Cl.
CPC .......... *H01S 3/094003* (2013.01); *G02B 6/02* (2013.01); *G02B 6/036* (2013.01);
(Continued)

(58) Field of Classification Search
CPC ............... H01S 3/094003; H01S 3/067; H01S 3/06708; H01S 3/07; G02B 6/02;
(Continued)

(56) References Cited

U.S. PATENT DOCUMENTS

| 5,018,824 A | 5/1991 | Ooe et al. |
| 5,864,644 A | 1/1999 | DiGiovanni et al. |

(Continued)

FOREIGN PATENT DOCUMENTS

| CN | 102207591 | * 10/2011 |
| CN | 102207591 A | 10/2011 |

(Continued)

OTHER PUBLICATIONS

Allowance dated Feb. 6, 2018, issued in related JP Application No. 2016-196650 ( 2 pages).

(Continued)

*Primary Examiner* — Armando Rodriguez
(74) *Attorney, Agent, or Firm* — Westerman, Hattori, Daniels & Adrian, LLP

(57) ABSTRACT

The present invention comprises a core (11) and a primary coating (12) that is lower in refractive index than the core (11) and that covers the side surface of the core (11) except in a coating-removed section (I0). The side surface of the core (11), in at least part of the coating-removed section (I0), is covered with an intermediate-refractive-index resin part (14) that is lower in refractive index than the core (11) and that is higher in refractive index than the primary coating (12).

17 Claims, 5 Drawing Sheets

(51) Int. Cl.
  *H01S 3/07* (2006.01)
  *H01S 3/067* (2006.01)
  *G02B 6/036* (2006.01)
  *G02B 6/255* (2006.01)
  *G02B 6/26* (2006.01)
  *G02B 6/02* (2006.01)

(52) U.S. Cl.
  CPC ............ *G02B 6/255* (2013.01); *G02B 6/262* (2013.01); *G02B 6/2856* (2013.01); *H01S 3/067* (2013.01); *H01S 3/06708* (2013.01); *H01S 3/07* (2013.01)

(58) Field of Classification Search
  CPC ........ G02B 6/036; G02B 6/255; G02B 6/262; G02B 6/2856
  See application file for complete search history.

(56) References Cited

U.S. PATENT DOCUMENTS

| | | | |
|---|---|---|---|
| 2010/0188735 A1 | 7/2010 | Tamaoki | |
| 2013/0308661 A1 | 11/2013 | Nishimura et al. | |
| 2014/0016656 A1* | 1/2014 | Taya | H01S 3/06704 372/6 |
| 2015/0062693 A1* | 3/2015 | Fishteyn | H01S 3/0407 359/341.1 |
| 2015/0247972 A1 | 9/2015 | Itoh | |
| 2016/0291256 A1 | 10/2016 | Rollinger | |
| 2016/0336710 A1 | 11/2016 | Tanaka | |

FOREIGN PATENT DOCUMENTS

| | | |
|---|---|---|
| CN | 103814315 A | 5/2014 |
| CN | 105980897 A | 9/2016 |
| EP | 61278 A1 | 9/1982 |
| EP | 2690724 A2 | 1/2014 |
| EP | 3104201 A1 | 12/2016 |
| EP | 3 188 327 A1 | 7/2017 |
| GB | 2186992 A | 8/1987 |
| JP | 54-074452 A | 6/1979 |
| JP | 57-168201 A | 10/1982 |
| JP | 59-121625 U | 8/1984 |
| JP | S60-176006 A | 9/1985 |
| JP | 5-73202 B2 | 10/1993 |
| JP | 11-72629 A | 3/1999 |
| JP | 2005-004127 A | 1/2005 |
| JP | 2008-9390 A | 1/2008 |
| JP | 2009-116076 A | 5/2009 |
| JP | 2011-186399 A | 9/2011 |
| JP | 2015-014800 A | 1/2015 |
| JP | 2015-125362 A | 7/2015 |
| WO | 2007/148127 A2 | 12/2007 |
| WO | 2012/133557 A1 | 10/2012 |
| WO | 2015/115636 A1 | 8/2015 |
| WO | 2016/31458 A1 | 3/2016 |

OTHER PUBLICATIONS

Office Action dated Nov. 14, 2017, issued in related JP Application No. 2016-196650 (3 pages).
Allowance dated Jun. 5, 2018, issued in counterpart JP Application No. 2016-196649 (1 page).
Related Co-pending U.S. Appl. No. 16/339,279.
Office Action dated Feb. 21, 2020, issued in counterpart CN Application No. 201780060986.3, with English translation. (14 pages).

* cited by examiner

OPTICAL FIBER AND FIBER LASER

TECHNICAL FIELD

The present invention relates to an optical fiber, and relates to a fiber laser including such an optical fiber.

BACKGROUND ART

In the field of material processing in which metal materials or the like are processed (e.g., cut, welded, shaved), laser processing using laser light has been increasingly used, replacing machining using a blade, a drill, or the like. Laser processing is superior both in processing accuracy and processing speed to machining. As a laser device for use in laser processing, a fiber laser has been attracting attention. The fiber laser is highly energy-efficient, and is capable of providing laser light with high beam qualities (i.e., with small beam diameter and small beam spreading angle).

A fiber laser is a laser device whose amplifying medium is a pump-gain fiber. Examples of the fiber laser include a resonator-type fiber laser and a MOPA (Master Oscillator Power Amplifire)-type fiber laser. As the pump-gain fiber, a double-clad fiber whose core is doped with a rare-earth element such as Yb is used. By introducing pump light into a cladding of the pump-gain fiber, it is possible to oscillate or amplify laser light.

The resonator-type fiber laser and the power amplifier (post amplifier) of a MOPA-type fiber laser use a plurality of laser diodes to generate pump light. The resonator-type fiber laser and the power amplifier (post amplifier) of the MOPA-type fiber laser use an optical combiner to combine pump lights generated by the respective laser diodes (see Patent Literatures 1 and 2). The optical combiner is an optical component that includes a plurality of input lead fibers and a single output lead fiber, and serves to combine the lights introduced via the respective input lead fibers and to send out the combined light via the output lead fiber. In the fiber laser, each of the input lead fibers of the optical combiner is connected to a laser diode via a pump fiber, whereas the output lead fiber of the optical combiner is connected to the pump-gain fiber. The optical combiner may have, at its input end, a delivery fiber port for receiving and sending out signal light, in addition to the input lead fibers connected to the pump fibers. The pump lights generated by the respective laser diodes are combined by the optical combiner and then introduced into the cladding of the pump-gain fiber.

The input lead fibers of the optical combiner for pump light (hereinafter referred to as a pump combiner), and the pump fibers that are fusion spliced to the input lead fibers, are each an optical fiber that guides only pump light therethrough. It is common to use, as such an optical fiber, a single-clad fiber constituted by: a core made of quartz glass; a primary coating made of resin and lower in refractive index than the core; and a secondary coating that is higher in refractive index than the core, such that the pump light is guided through the core. Since the core is made of quartz glass, the core is capable of guiding high-power pump light. Furthermore, since the cladding is made of a resin that is significantly different in refractive index from quartz glass, the numerical aperture (hereinafter referred to as NA) of the core is large and thus the pump light from the laser diodes can be efficiently introduced into the core.

On the other hand, the output lead fiber of the pump combiner, and the pump-gain fiber that is fusion spliced to the output lead fiber, are each an optical fiber that guides both the pump light and laser light therethrough. It is common to use, as such an optical fiber, a double-clad fiber constituted by: a core made of quartz glass; a cladding made of quartz glass and lower in refractive index than the core; a primary coating made of resin and lower in refractive index than the cladding; and a secondary coating that is higher in refractive index than the core, such that the laser light is guided through the core and that the pump light is guided through the cladding.

Incidentally, fusion splicing between optical fibers has to be done after removing coatings from an end portion of each fiber. This means that the primary coating and the secondary coating are removed from areas containing the fusion splice points between the input lead fibers and the pump fibers of the pump combiner. Similarly, the primary coating and the secondary coating are removed also from an area containing the fusion splice point between the output lead fiber of the pump combiner and the pump-gain fiber. Furthermore, also when an optical fiber is subjected to some other processing other than fusion splicing, the coating(s) of the optical fiber has to be removed from an area containing the to-be-processed point. For example, in a case of a resonator-type fiber laser, the pump-gain fiber has its opposite ends connected to fiber Bragg gratings. The fiber Bragg gratings are each a double-clad fiber having therein a grating that causes Bragg reflection. From an area containing the grating, the primary coating and the secondary coating are to be removed. Such an area from which the primary coating and the secondary coating have been removed is hereinafter referred to as a "coating-removed section". The coating-removed section borders on two other sections in each of which the primary coating and the secondary coating are left unremoved. Of these two sections, one section that is closer to the light-entrance end than the coating-removed section is referred to as a "first coated section", whereas the other section that is closer to the light-exit end than the coating-removed section is referred to as a "second coated section".

In the coating-removed section, the exposed portion of the optical waveguide (core or cladding) has to be covered with a medium that is lower in refractive index than that optical waveguide. This is because, otherwise, the coating-removed section is not capable of confining light within the optical waveguide. Patent Literature 3 discloses an arrangement in which an exposed portion of an optical waveguide in a coating-removed section is covered with a low-refractive-index resin. Patent Literature 4 discloses an arrangement in which an exposed portion of an optical waveguide in a coating-removed section is covered with air (air cladding).

CITATION LIST

Patent Literature

[Patent Literature 1]
Japanese Patent Application Publication, Tokukaihei, No. 11-72629 (Publication date: Mar. 16, 1999)
[Patent Literature 2]
Japanese Patent Application Publication, Tokukai, No. 2008-9390 (Publication date: Jan. 17, 2008)
[Patent Literature 3]
Japanese Examined Patent Application Publication, Tokukoh, No. 5-73202 (Publication date: Oct. 13, 1993)
[Patent Literature 4]
Japanese Patent Application Publication, Tokukai, No. 2009-116076 (Publication date: May 28, 2009)

SUMMARY OF INVENTION

Technical Problem

Conventionally, a medium that is lower in refractive index than the primary coating has been selected as the medium which covers the exposed portion of the optical waveguide in the coating-removed section, for the following reason. In cases where the medium that covers the exposed portion of the optical waveguide in the coating-removed section is lower in refractive index than the primary coating, the result is that the NA of the optical waveguide in the first coated section, which is closer to the light-entrance end than the coating-removed section, is smaller than the NA of the optical waveguide in the coating-removed section. This makes it possible to prevent light with a large propagation angle (i.e., the angle between the direction of light propagation and the optical axis of the optical fiber), which cannot be confined within the optical waveguide in the coating-removed section, from entering the coating-removed section from the first coated section and leaking out of the optical waveguide at the coating-removed section.

However, if the medium that covers the exposed portion of the optical waveguide in the coating-removed section is lower in refractive index than the primary coating, the following issue arises. Specifically, in cases where the medium that covers the exposed portion of the optical waveguide in the coating-removed section is lower in refractive index than the primary coating, the result is that the NA of the optical waveguide in the coating-removed section is greater than the NA of the optical waveguide in the second coated section, which is closer to the light-exit end than the coating-removed section. Therefore, if light with a large propagation angle which cannot be confined within the optical waveguide in the second coated section is produced at the processed part of the coating-removed section, this light will enter the second coated section from the coating-removed section and leak out of the optical waveguide at the second coated section.

The material for the primary coating is selected from resin materials that have a small Young's modulus, that are highly transparent, and that are well adhesive to quartz, whereas the material for the secondary coating is selected from resin materials that are highly wear-resistant, that are highly resistant to external forces, and that are easily workable when wound on and unwound from a reel. As such, the secondary coating is made of a material with low transparency in many cases. Therefore, if the light leakage as described earlier occurs, the secondary coating in the second coated section may absorb the leaked light and generate heat. Such heat generation may cause a reduction in reliability of the optical fiber and thus should be avoided.

One aspect of the present invention was made in view of the above issue, and an object thereof is to provide an optical fiber which is arranged such that light leakage from an optical waveguide, which would occur in a coated section that is closer to the light-exit end than a coating-removed section, is prevented or reduced, and thus is more reliable than conventional optical fibers.

Solution to Problem

In order to attain the above object, an optical fiber in accordance with one aspect of the present invention includes: an optical waveguide; and a coating that is lower in refractive index than the optical waveguide and that covers a side surface of the optical waveguide except in a coating-removed section, in at least part of the coating-removed section, the side surface of the optical waveguide being covered with a medium that is lower in refractive index than the optical waveguide and that is higher in refractive index than the coating.

Advantageous Effects of Invention

According to one aspect of the present invention, it is possible to provide an optical fiber which is arranged such that light leakage from an optical waveguide, which would occur in a coated section that is closer to the light-exit end than a coating-removed section, is prevented or reduced, and thus is more reliable than conventional optical fibers.

Figure 1:
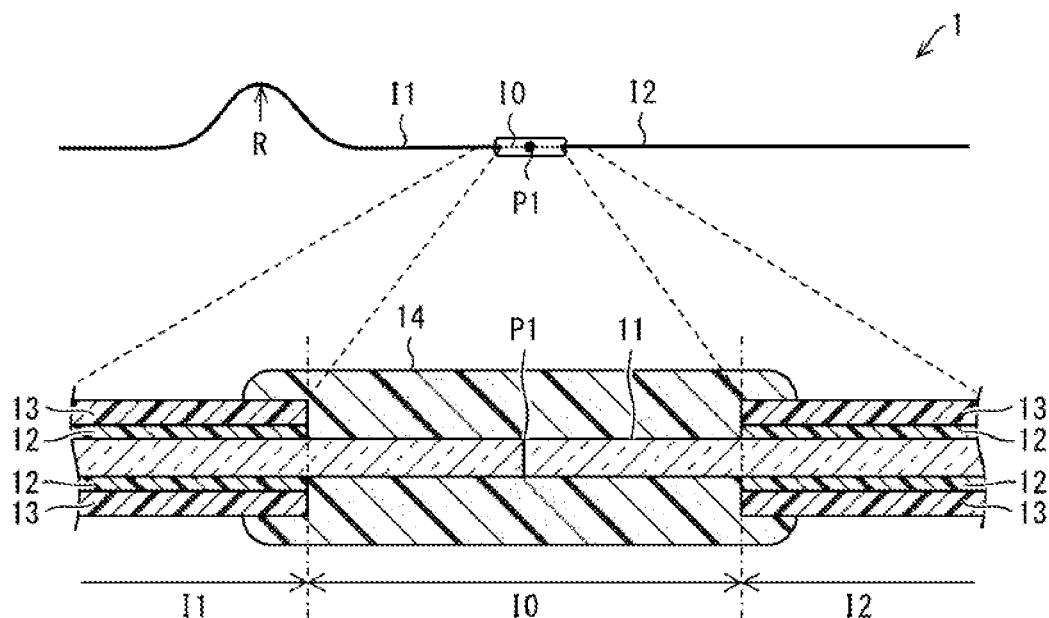
FIG. 1 shows a configuration of an optical fiber in accordance with Embodiment 1 of the present invention. The upper part of FIG. 1 schematically illustrates the optical fiber, and the lower part of FIG. 1 is a partial longitudinal cross-sectional view of the optical fiber.
Figure 2:
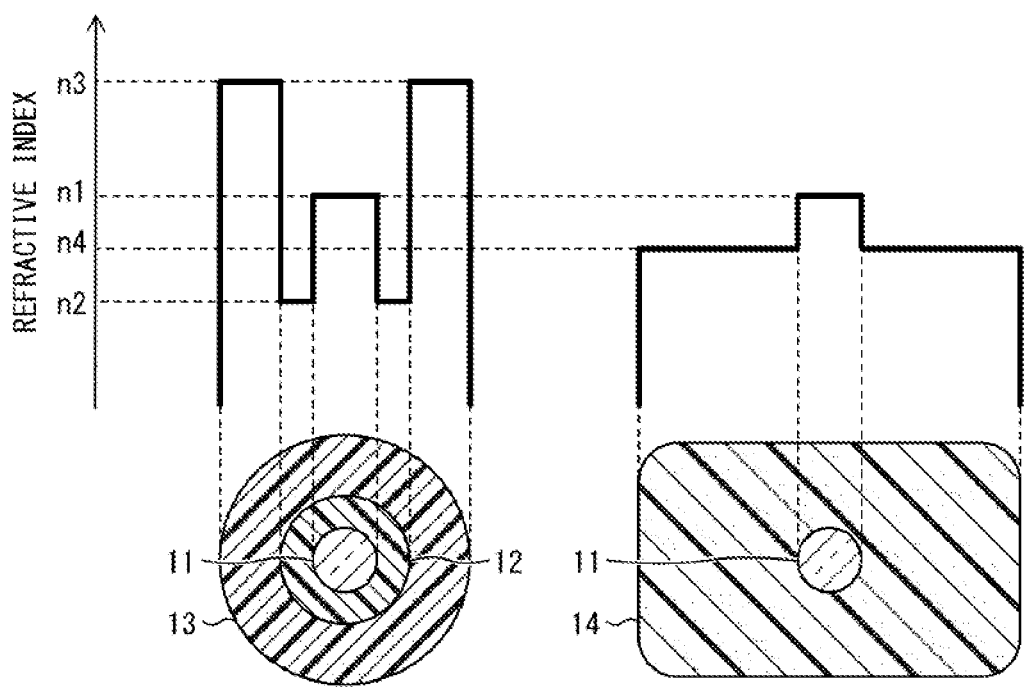

The lower left part of FIG. 2 is a transverse cross-sectional view of a coated section of the optical fiber shown in FIG. 1, and the upper left part of FIG. 2 is a graph showing refractive index distribution in the coated section of the optical fiber. The lower right part of FIG. 2 is a transverse cross-sectional view of a coating-removed section of the optical fiber shown in FIG. 1, and the upper right part of FIG. 2 is a graph showing refractive index distribution in the coating-removed section of the optical fiber.

Figure 3:
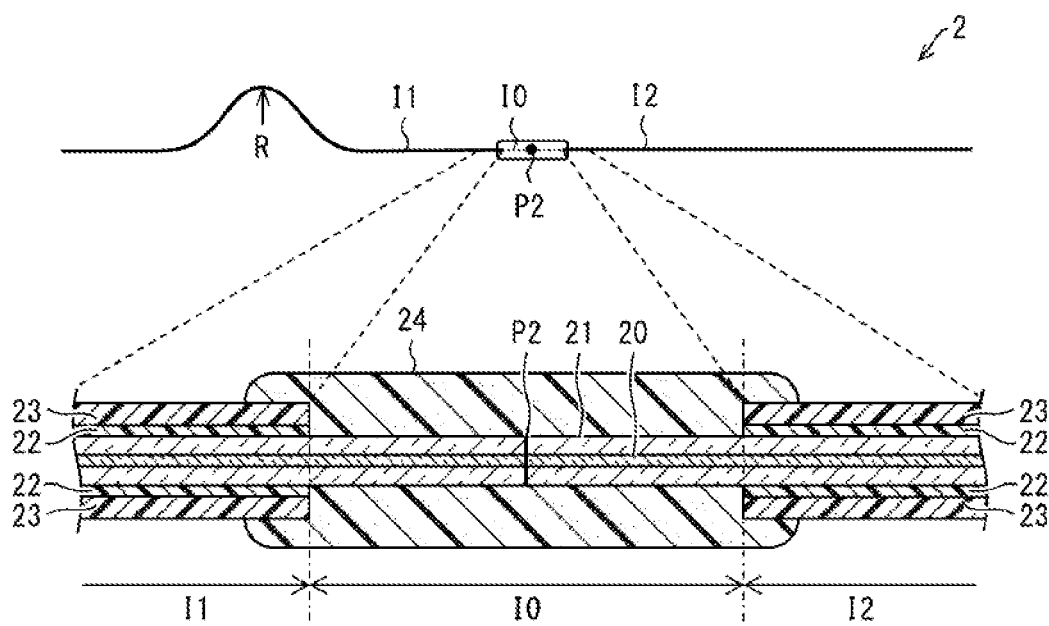

FIG. 3 illustrates a configuration of an optical fiber in accordance with Embodiment 2 of the present invention. The upper part of FIG. 3 schematically illustrates the optical fiber, and the lower part of FIG. 3 is a partial longitudinal cross-sectional view of the optical fiber.

Figure 4:
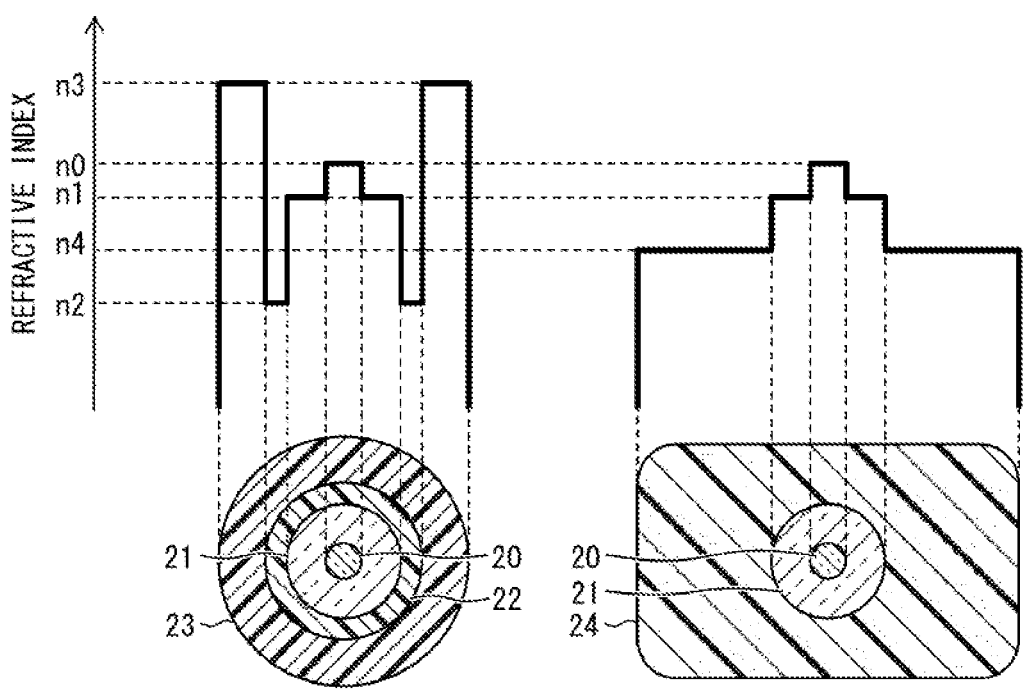

The lower left part of FIG. 4 is a transverse cross-sectional view of a coated section of the optical fiber shown in FIG. 3, and the upper left part of FIG. 4 is a graph showing refractive index distribution in the coated section of the optical fiber. The lower right part of FIG. 4 is a transverse cross-sectional view of a coating-removed section of the optical fiber shown in FIG. 3, and the upper right part of FIG. 4 is a graph showing refractive index distribution in the coating-removed section of the optical fiber.

Figure 5:
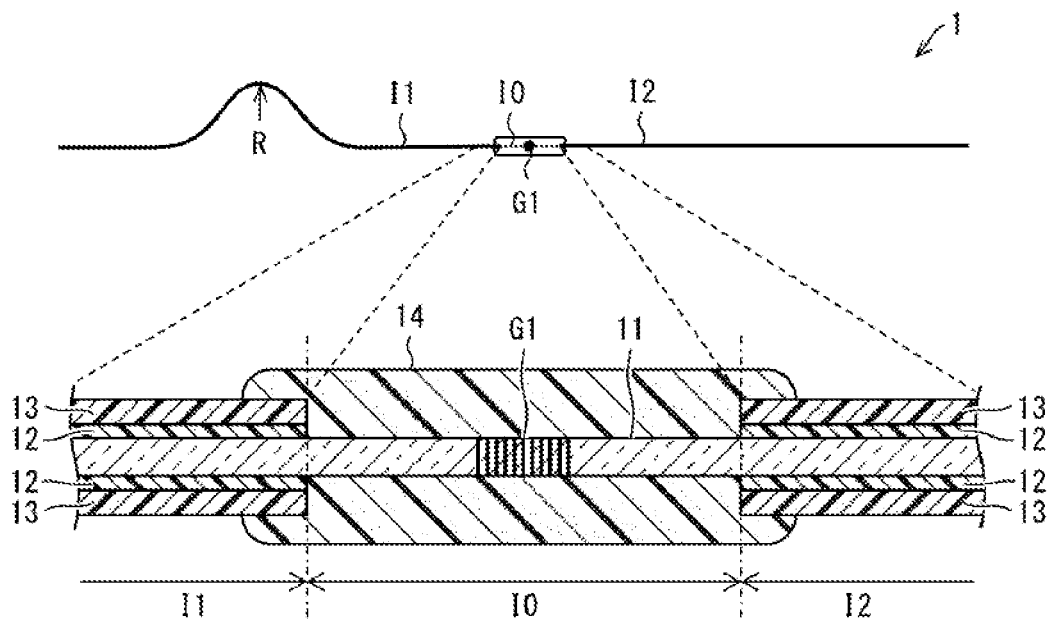

FIG. 5 shows a partial longitudinal cross-sectional view illustrating one variation of the optical fiber shown in FIG. 1.

Figure 6:
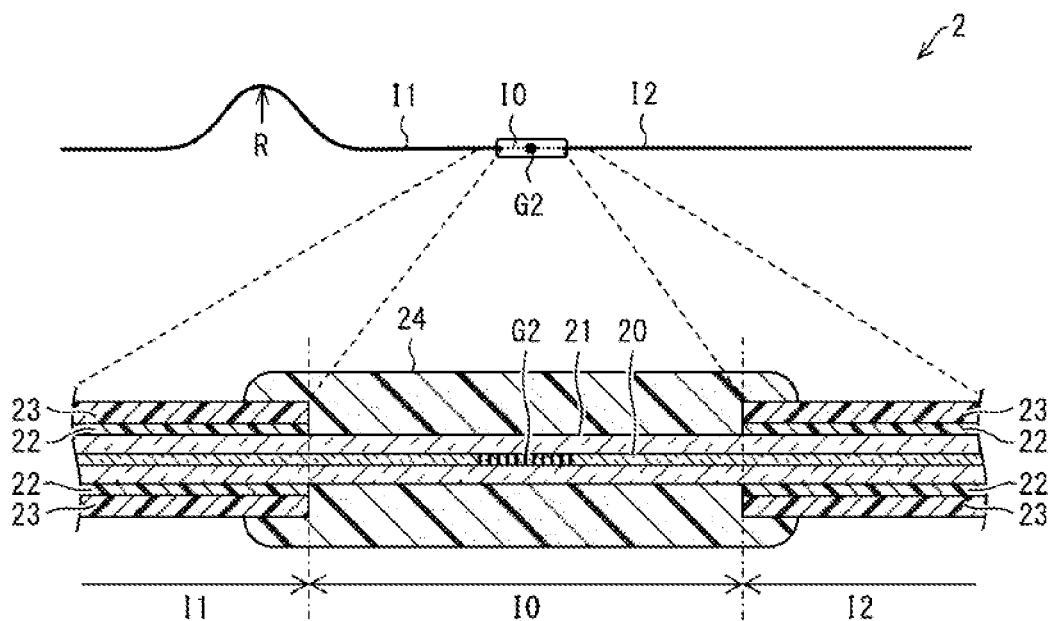

FIG. 6 shows a partial longitudinal cross-sectional view illustrating one variation of the optical fiber shown in FIG. 3.

Figure 7:
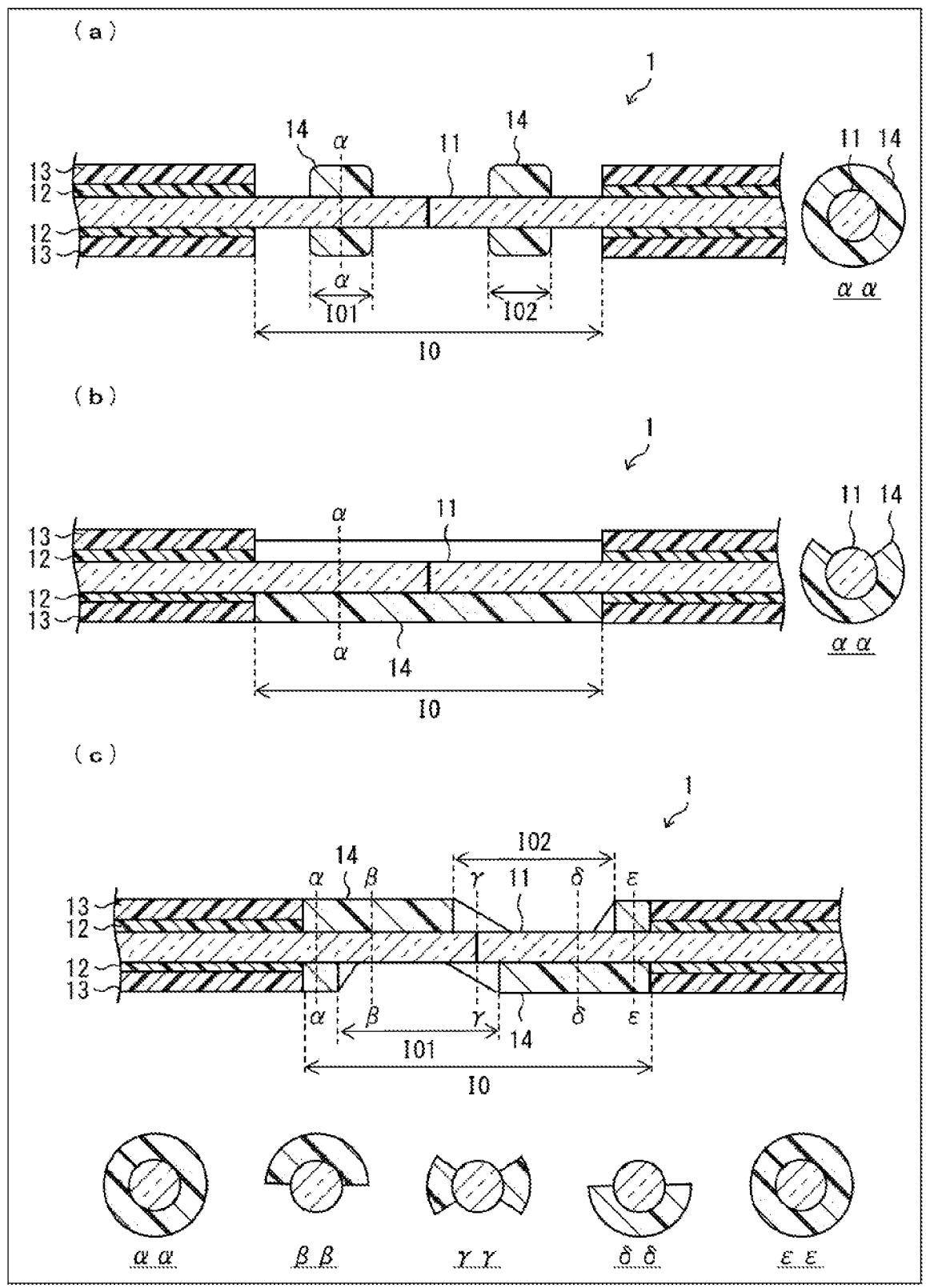

FIG. 7 shows partial longitudinal cross-sectional views and transverse cross-sectional views illustrating other variations of the optical fiber shown in FIG. 1.

Figure 8:
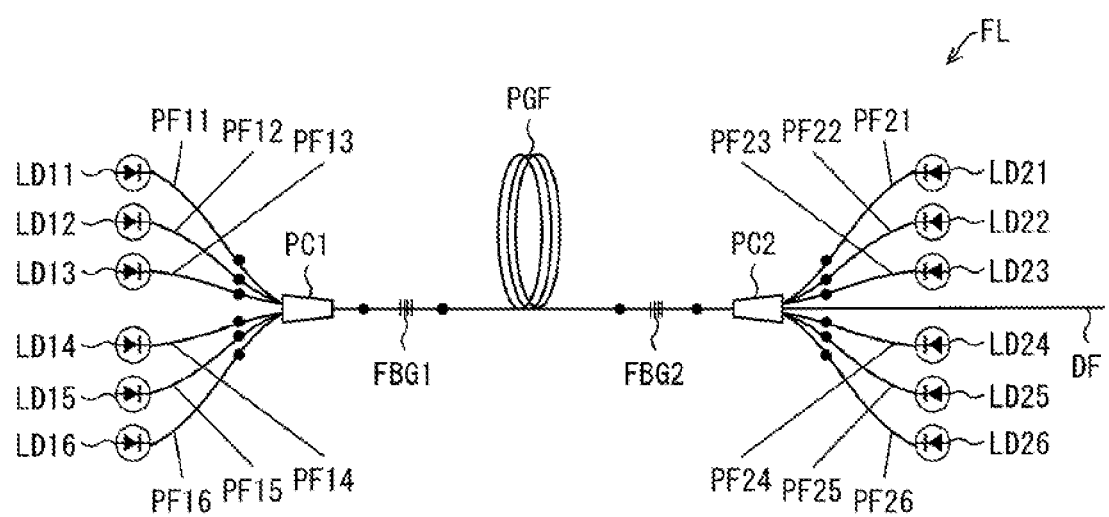

FIG. 8 is a block diagram illustrating a fiber laser that includes the optical fiber shown in FIG. 1 or 3.

DESCRIPTION OF EMBODIMENTS

Embodiment 1

The following description will discuss a configuration of an optical fiber 1 in accordance with Embodiment 1 of the present invention, with reference to FIGS. 1 and 2. The upper part of FIG. 1 schematically illustrates the optical fiber 1 having a fusion splice point P1 as a processed point, and the lower part of FIG. 1 is an enlarged partial longitudinal cross-sectional view of a portion containing the fusion splice point P1 of the optical fiber 1. The right part of FIG. 2 shows (i) refractive index distribution of the optical fiber 1 in a coating-removed section I0 that contains the fusion splice point P1 (upper right part) and (ii) a transverse cross-sectional view of the optical fiber 1 in the coating-removed section I0 (lower right part). The left part of FIG. 2 shows (i) refractive index distribution in coated sections I1 and I2 bordering on the coating-removed section I0 (upper left part) and (ii) a transverse cross-sectional view of the optical fiber 1 in the coated sections I1 and I2 (lower left part).

As illustrated in the lower part of FIG. 1, the optical fiber 1 includes: a core 11 in the form of a circular rod (the core 11 is one example of the "optical waveguide" recited in the claims); a primary coating 12 that is in the form of a circular tube and that covers the side surface of the core 11 (the primary coating 12 is one example of the "coating" recited in the claims); and a secondary coating 13 that is in the form of a circular tube and that covers the outer surface of the primary coating 12. The core 11 is made of quartz glass, and the primary coating 12 and the secondary coating 13 are each made of resin. The core 11 has a refractive index $n1$, the primary coating 12 has a refractive index $n2$, and the secondary coating 13 has a refractive index $n3$ such that the refractive index $n1$, the refractive index $n2$, and the refractive index $n3$ satisfy the relationship: $n2<n1<n3$, as illustrated in the left part of FIG. 2. Specifically, the optical fiber 1 is a single-clad fiber designed to confine light within the core 11 by utilizing the difference between the refractive index $n1$ of the core 11 made of quartz glass and the refractive index $n2$ of the primary coating 12 made of resin (such a difference is represented as "$n1-n2$"). Such an optical fiber 1 is used as, for example, some of the optical fibers constituting a fiber laser which only guide pump light therethrough, that is, pump fibers and input lead fibers of a pump combiner.

The optical fiber 1 is obtained by fusion-splicing end surfaces of two optical fibers each having the foregoing structure. As illustrated in the upper and lower parts of FIG. 1, in the section I0 that contains the fusion splice point P1, the primary coating 12 and the secondary coating 13 have been removed. Such a section I0 is referred to as the "coating-removed section I0" in this specification. The coating-removed section I0 borders on two sections, one of which is referred to as the "first coated section I1" and the other of which is referred to as the "second coated section I2".

The optical fiber 1 is characterized in that, in at least part of (in Embodiment 1, the entirety of) the coating-removed section I0, there is provided an intermediate-refractive-index resin part 14 that covers the side surface of the core 11. The intermediate-refractive-index resin part 14 may be (1) a part that is formed by allowing a resin filled in a groove (in which the coating-removed section I0 of the optical fiber 1 is stored) in a metal block to cure. The intermediate-refractive-index resin part 14 may be (2) a part that is formed by inserting the coating-removed section I0 of the optical fiber 1 into a heat-shrinkable tube filled with a thermoplastic resin and allowing the heat-shrinkable tube to shrink. Alternatively, the intermediate-refractive-index resin part 14 may be (3) a part that is formed by recoating. The intermediate-refractive-index resin part 14 may be composed of a plurality of resin parts. In this case, the resin parts may be spaced from each other. The plurality of resin parts may be arranged so as to form a plurality of layers stacked together in the radial direction of the optical fiber 1, or may be arranged so as to form a plurality of sections arranged in the axial direction of the optical fiber 1. The plurality of resin parts may be composed of a single kind of resin material, or may be composed of two or more kinds of resin material.

The intermediate-refractive-index resin part 14 is composed of a resin that (1) is higher in transmittance than the secondary coating 13 (e.g., has a transmittance of not less than 97%/mm) at the wavelength of light propagating through the core 11 and (2) has a refractive index $n4$ that is lower than the refractive index $n1$ of the core 11 and that is higher than the refractive index $n2$ of the primary coating 12 as illustrated in the right part of FIG. 2. Since the refractive index $n4$ of the intermediate-refractive-index resin part 14 is lower than the refractive index $n1$ of the core 11, the coating-removed section I0 is also capable of confining light within the core 11. Furthermore, since the refractive index $n4$ of the intermediate-refractive-index resin part 14 is higher than the refractive index $n2$ of the primary coating 12, the "light-confining ability" of the coating-removed section I0 is weaker than those of the first coated section I1 and the second coated section. More accurately, NA0, which is the NA of the core 11 in the coating-removed section I0, is smaller than NA1 and NA2, which are the NAs of the core 11 in the first coated section I1 and in the second coated section I2, respectively.

The light-confining ability of the coating-removed section I0 is weaker than the light-confining ability of the first coated section I1 and the second coated section. Therefore, the optical fiber 1 brings about the following effect when light propagates from the first coated section I1 to the second coated section I2 (from left to right in FIG. 1). Specifically, NA0, which is the NA of the core 11 in the coating-removed section I0, is smaller than NA2, which is the NA of the core 11 in the second coated section I2. This makes it possible to eliminate or reduce the likelihood that light which cannot be confined within the core 11 in the second coated section will enter the second coated section I2 from the coating-removed section I0 (because such light leaks out of the core 11 and escapes into the intermediate-refractive-index resin part 14 while propagating through the coating-removed section I0). That is, it is possible to eliminate or reduce the likelihood that the primary coating 12 and the secondary coating 13 in the second coated section I2 will absorb light leaked from the core 11 and generate heat and degrade.

Note that, NA1, which is the NA of the core 11 in the first coated section I1, is greater than NA0, which is the NA of the core 11 in the coating-removed section I0; therefore, light that cannot be confined within the core in the coating-removed section I0 may enter the coating-removed section I0 from the first coated section I1. That is, the intermediate-refractive-index resin part 14 in the coating-removed section I0 may absorb light that has been leaked from the core 11 and that has escaped into the intermediate-refractive-index resin part 14, and may generate heat and degrade. However, the intermediate-refractive-index resin part 14 has a larger cross section than the secondary coating 13 and is made of a resin that is higher in transmittance than the secondary coating 13; therefore, even if the light leaked from the core 11 enters the intermediate-refractive-index resin part 14, the power density of the entered light is sufficiently small and the conversion efficiency from the entered light to heat is also sufficiently low. As such, even if the intermediate-refractive-index resin part 14 generates heat, the quantity of heat is extremely small, and, even if the intermediate-refractive-index resin part 14 degrades, the extent of the degradation is extremely small. Furthermore, unlike the coated sections I1 and I2, the intermediate-refractive-index resin part 14 does not have any high-refractive-index region therein such as that of the secondary coating 13, and therefore light is quickly scattered within the intermediate-refractive-index resin part 14. As such, a heat generating region is widely dispersed and the temperature rise is prevented or reduced.

Furthermore, by employing an arrangement in which NA1min (which is the minimum value of the NA of the core 11 in the first coated section I1) is not greater than NA0 (which is the NA of the core 11 in the coating-removed section I0), it is possible to reduce the likelihood that the light that cannot be confined within the core 11 in the coating-removed section I0 will enter the coating-removed section I0 from the first coated section I1. Such an arrangement is achieved by, for example, bending the optical fiber 1 in the first coated section I1 as illustrated in FIG. 1.

In so doing, a minimum bend radius R of the optical fiber 1 in the first coated section I1 may be set as below. Specifically, the NA1min (which is the minimum value of the NA of the core 11 in the first coated section I1) is given by the following Equation (3), where θbend is defined by the following Equation (1) and θcmax is defined by the following Equation (2), assuming that the diameter of the core 11 is D. Therefore, the minimum bend radius R of the optical fiber 1 in the first coated section I1 needs only be set such that the NA1min, which is given by Equation (3), is less than NA0 (which is the NA of the core 11 in the coating-removed section I0).

$$\cos(\theta_{bend}) = 1 - \frac{D}{R} \quad (1)$$

$$n_1 \sin(\theta_{cmax}) = \sqrt{n_1^2 - n_2^2} \quad (2)$$

$$NA1_{min} = n_1 \sin(\theta_{cmax} - \theta_{bend}) \quad (3)$$

Note that, in Embodiment 1, the medium that covers the side surface of the core 11 is the intermediate-refractive-index resin part 14, which is uniform in refractive index; however, the present invention is not limited as such. Specifically, the medium that covers the side surface of the core 11 may be an intermediate-refractive-index resin part 14 that is non-uniform in refractive index, instead of the intermediate-refractive-index resin part 14 that is uniform in refractive index, provided that the refractive index of the intermediate-refractive-index resin part 14 at and near the interface between the intermediate-refractive-index resin part 14 and the core 11 is lower than the refractive index n1 of the core 11 and is higher than the refractive index n2 of the primary coating 12. The intermediate-refractive-index resin part 14 may be partially absent. In this case, an exposed portion, of the side surface of the core 11, which is not covered by the intermediate-refractive-index resin part 14 is preferably not in contact with any medium that has a refractive index equal to or higher than the refractive index n1 of the core 11. This is because, if such a medium is in contact with the side surface of the core 11, the core 11 may be unable to confine light therein and the light may leak out through the contact part. Thus, the exposed portion, of the side surface of the core 11, which is not covered by the intermediate-refractive-index resin part 14 is preferably covered with a gas (air cladding) or some other resin part each of which has a refractive index lower than the refractive index n1 of the core 11. Specific variations will be described later with reference to other drawings.

[Verification of Effect]

An optical fiber 1 as described below was prepared as an Example: an optical fiber 1 in which the diameter of the core 11 is 0.3 mm, the refractive index n1 of the core 11 is 1.45, the refractive index n2 of the primary coating 12 is 1.36, the refractive index n3 of the secondary coating 13 is 1.53, and the refractive index n4 of the intermediate-refractive-index resin part 14 is 1.38. The minimum bend radius R of the optical fiber 1 in the first coated section I1 was set to 100 mm. In this case, the minimum value of the NA of the core 11 in the first coated section I1 is calculated as 0.396, the NA of the core 11 in the coating-removed section I0 is calculated as 0.445, and the NA of the core 11 in the second coated section I2 is calculated as 0.503.

The temperature of the optical fiber 1 in accordance with the Example was measured with the use of a thermal imager while introducing light of 1 kW. As a result, it was confirmed that (1) the temperature rose to the greatest extent at and near the fusion splice point P1 and (2) the amount of temperature rise at the fusion splice point P1 was 5° C.

An optical fiber as described below was prepared as a Comparative Example: an optical fiber that is the same as the optical fiber 1 of the Example except that the refractive index n4 of the intermediate-refractive-index resin part 14 is 1.34. In this case, the minimum value of the NA of the core 11 in the first coated section I1 and the NA of the core 11 in the second coated section I2 are calculated as the same values as those of the optical fiber 1 in accordance with the Example; however, the NA of the core 11 in the coating-removed section I0 is calculated as 0.587.

The temperature of the optical fiber in accordance with the Comparative Example was measured with the use of a thermal imager while introducing light of 1 kW. As a result, it was confirmed that (1) the temperature rose to the greatest extent at the coating-removed-section-I0-side end of the second coated section I2 and (2) the amount of temperature rise at the coating-removed-section-I0-side end of the second coated section I2 was 20° C.

The above results experimentally demonstrate that the light that cannot be confined within the core 11 in the second coated section I2 does not enter the second coated section I2 from the coating-removed section I0. That is, the above results experimentally demonstrate that the primary coating 12 and the secondary coating 13 in the second coated section I2 do not absorb light leaked from the core 11 and thus do not generate heat.

Embodiment 2

The following description will discuss a configuration of an optical fiber 2 in accordance with Embodiment 2 of the present invention, with reference to FIGS. 3 and 4. The upper part of FIG. 3 schematically illustrates the optical fiber 2 which has a fusion splice point P2, and the lower part of FIG. 3 is an enlarged partial longitudinal cross-sectional view of a portion containing the fusion splice point P2 of the optical fiber 2. The right part of FIG. 4 shows (i) refractive index distribution of the optical fiber 2 in a coating-removed section I0 containing the fusion splice point (upper right part) and (ii) a transverse cross-sectional view of the optical fiber 2 in the coating-removed section I0 (lower right part). The left part of FIG. 4 shows (i) refractive index distribution in coated sections I1 to I2 bordering on the coating-removed section I0 (upper left part) and (ii) a transverse cross-sectional view of the optical fiber 2 in the coated sections I1 to I2 (lower left part).

As illustrated in the lower part of FIG. 3, the optical fiber 2 includes: a core 20 in the form of a circular rod; an inner cladding 21 that is in the form of a circular tube and that covers the side surface of the core 20 (the inner cladding 21 is one example of the "optical waveguide" recited in the claims); an outer cladding 22 that is in the form of a circular tube and that covers the outer surface of the inner cladding 21 (the outer cladding 22 is one example of the "coating" recited in the claims); and an outer jacket 23 that is in the form of a circular tube and that covers the outer surface of the outer cladding 22. The core 20 and the inner cladding 21 are each made of quartz glass, and the outer cladding 22 and the outer jacket 23 are each made of resin. The core 20 has a refractive index n0, the inner cladding 21 has a refractive index n1, the outer cladding 22 has a refractive index n2, and the outer jacket 23 has a refractive index n3 such that the refractive index n0, the refractive index n1, the refractive index n2, and the refractive index n3 satisfy the relationship: n2<n1<n0<n3, as illustrated in the left part of FIG. 4. Specifically, the optical fiber 2 is a double-clad fiber designed to confine light within the core 20 by utilizing the difference between the refractive index n0 of the core 20 made of quartz glass and the refractive index n1 of the inner cladding 21 made of quartz glass (such a difference is represented as "n0−n1") and confine light within the inner cladding 21 by utilizing the difference between the refractive index n1 of the inner cladding 21 made of quartz glass and the refractive index n2 of the outer cladding 22 made of resin (such a difference is represented as "n1−n2"). Such an optical fiber 2 is used as, for example, some of the optical fibers constituting a fiber laser which guide laser light and pump light therethrough, that is, a pump-gain fiber and an output lead fiber of a pump combiner.

The optical fiber 2 is obtained by fusion-splicing end surfaces of two optical fibers each having the foregoing structure. As illustrated in the upper and lower parts of FIG. 3, in the section I0 that contains the fusion splice point P2, the outer cladding 22 and the outer jacket 23 have been removed. Such a section I0 is referred to as the "coating-removed section I0" in this specification. The coating-removed section I0 borders on two sections, one of which is referred to as the "first coated section I1" and the other of which is referred to as the "second coated section I2".

The optical fiber 2 is characterized in that, in at least part of (in Embodiment 2, the entirety of) the coating-removed section I0, there is provided an intermediate-refractive-index resin part 24 that covers the side surface of the inner cladding 21. The intermediate-refractive-index resin part 24 is composed of a resin that (1) is higher in transmittance than the outer jacket 23 (e.g., has a transmittance of not less than 97%/mm) at the wavelength of light propagating through the inner cladding 21, and (2) has a refractive index n4 that is lower than the refractive index n1 of the inner cladding 21 and that is higher than the refractive index n2 of the outer cladding 22 as illustrated in the right part of FIG. 4. Therefore, the optical fiber 2 is capable of confining light within the inner cladding 21 also in the coating-removed section I0; however, the light-confining ability of the coating-removed section I0 is weaker than those of the first coated section I1 and the second coated section I2. More accurately, NA0, which is the NA of the inner cladding 21 in the coating-removed section I0, is smaller than NA1 and NA2, which are the NAs of the inner cladding 21 in the first coated section I1 and the second coated section I2, respectively.

Because of the above characteristics, the optical fiber 2 brings about the following effect when light propagates from the first coated section I1 to the second coated section I2 (from left to right in FIG. 3). Specifically, NA0, which is the NA of the inner cladding 21 in the coating-removed section I0, is smaller than NA2, which is the NA of the inner cladding 21 in the second coated section I2. This makes it possible to eliminate or reduce the likelihood that light which cannot be confined within the inner cladding 21 in the second coated section I2 will enter the second coated section I2 from the coating-removed section I0 (because such light leaks out of the inner cladding 21 and escapes into the intermediate-refractive-index resin part while propagating through the coating-removed section I0). That is, it is possible to eliminate or reduce the likelihood that the outer cladding 22 and the outer jacket 23 in the second coated section I2 will absorb light leaked from the inner cladding 21 and generate heat and degrade.

Note that NA1, which is the NA of the inner cladding 21 in the first coated section I1, is greater than NA0, which is the NA of the inner cladding 21 in the coating-removed section I0; therefore, light that cannot be confined within the inner cladding 21 in the coating-removed section I0 (i.e., light whose NA is greater than NA0) may enter the coating-removed section I0 from the first coated section I1. That is, the intermediate-refractive-index resin part 24 in the coating-removed section I0 may absorb light coming from the inner cladding 21 and may generate heat and degrade. However, unlike the coated sections I1 and I2, the intermediate-refractive-index resin part 24 does not have any high-refractive-index region therein such as that of the outer jacket 23, and therefore light is quickly scattered within the intermediate-refractive-index resin part 24. As such, a heat generating region is widely dispersed and the temperature rise is prevented or reduced. Furthermore, since the intermediate-refractive-index resin part 24 is made of a resin that is transparent at the wavelength of light propagating through the inner cladding 21, even if the intermediate-refractive-index resin part 24 generates heat, the quantity of heat is extremely small, and, even if the intermediate-refractive-index resin part 24 degrades, the extent of the degradation is extremely small.

Furthermore, by employing an arrangement in which NA1min (which is the minimum value of the NA of the inner cladding 21 in the first coated section I1) is less than NA0 (which is the NA of the inner cladding 21 in the coating-removed section I0), it is possible to eliminate the likelihood that the light that cannot be confined within the inner cladding 21 in the coating-removed section I0 will enter the coating-removed section I0 from the first coated section I1. Such an arrangement is achieved by, for example, bending the optical fiber 2 in the first coated section I1 as illustrated in FIG. 3.

In so doing, a minimum bend radius R of the optical fiber 2 in the first coated section I1 may be set as below. Specifically, the NA1min (which is the minimum value of the NA of the inner cladding 21 in the first coated section I1) is given by the foregoing Equation (3), where θbend is defined by the foregoing Equation (1) and θcmax is defined by the foregoing Equation (2), assuming that the diameter of the inner cladding 21 is D. Therefore, the minimum bend radius R of the optical fiber 2 in the first coated section I1 needs only be set such that the NA1min, which is given by the foregoing Equation (3), is less than NA0 (which is the NA of the inner cladding 21 in the coating-removed section I0).

[Variations 1]

The optical fibers 1 and 2 in accordance with Embodiments 1 and 2 as described above are each an optical fiber in which its core 11 or 21 has the fusion splice point P1 or P2 formed therein; however, the present invention is not limited as such. That is, the present invention is applicable to any optical fiber in which some processing that necessitates removal of a coating(s) has been done. For example, the present invention is applicable to an optical fiber that has a grating formed therein, or the like.

FIG. 5 shows a partial longitudinal cross-sectional view illustrating one variation of the optical fiber 1 in accordance with Embodiment 1. The optical fiber 1 in accordance with this variation is the same as the optical fiber 1 illustrated in FIG. 1, except that a Bragg grating G1 is provided in place of the fusion splice point P1. The rest of the configuration of the optical fiber 1 in accordance with this variation is the same as that of the optical fiber 1 illustrated in FIG. 1, and thus the descriptions therefor are omitted here.

Similarly to the optical fiber 1 illustrated in FIG. 1, also according to the optical fiber 1 illustrated in FIG. 5, NA0, which is the NA of the core 11 in the coating-removed section I0, is smaller than NA2, which is the NA of the core 11 in the second coated section I2. This makes it possible to eliminate or reduce the likelihood that light which cannot be confined within the core 11 in the second coated section I2 will enter the second coated section I2 from the coating-removed section I0. Thus, it is possible to eliminate or reduce the likelihood that the primary coating 12 and the secondary coating 13 in the second coated section I2 will absorb light leaked from the core 11 and generate heat and degrade.

FIG. 6 shows a partial longitudinal cross-sectional view illustrating one variation of the optical fiber 2 in accordance with Embodiment 2. The optical fiber 2 in accordance with this variation is the same as the optical fiber 2 illustrated in FIG. 2, except that a Bragg grating G2 is provided in place of the fusion splice point P2. The rest of the configuration of the optical fiber 2 in accordance with this variation is the same as that of the optical fiber 2 illustrated in FIG. 2, and thus the descriptions therefor are omitted here.

Similarly to the optical fiber 2 illustrated in FIG. 3, also according to the optical fiber 2 illustrated in FIG. 6, NA0, which is the NA of the inner cladding 21 in the coating-removed section I0, is smaller than NA2, which is the NA of the inner cladding 21 in the second coated section I2. This makes it possible to eliminate or reduce the likelihood that light which cannot be confined within the inner cladding 21 in the second coated section I2 will enter the second coated section I2 from the coating-removed section I0. Thus, it is possible to eliminate or reduce the likelihood that the outer cladding 22 and the outer jacket 23 in the second coated section I2 will absorb light leaked from the inner cladding 21 and generate heat and degrade.

[Variations 2]

The foregoing optical fiber 1 in accordance with Embodiment 1 employs an arrangement in which the side surface of the core 11 is covered with the intermediate-refractive-index resin part 14 from all directions in every transverse cross section in the coating-removed section I0; however, the present invention is not limited as such. Specifically, the following arrangement may be employed: the side surface of the core 11 is covered with the intermediate-refractive-index resin part 14 only in some transverse cross sections in the coating-removed section M. Alternatively, the following arrangement may be employed: the side surface of the core 11 is covered with the intermediate-refractive-index resin part 14 from only some directions in a transverse cross section.

(a) of FIG. 7 shows a partial longitudinal cross-sectional view (left) and a transverse cross-sectional view (right), each illustrating one variation of the optical fiber 1 in accordance with Embodiment 1. The transverse cross-sectional view is taken along line αα in the partial longitudinal cross-sectional view. As illustrated in (a) of FIG. 7, according to the optical fiber 1 in accordance with this variation, the intermediate-refractive-index resin part 14 is absent except in sections I01 and I02. That is, the side surface of the core 11, only in some transverse cross sections in the coating-removed section I0 (that is, in each transverse cross section in the sections I01 and I02), is covered with the intermediate-refractive-index resin part 14 from all directions in that transverse cross section. In the coating-removed section I0, a portion of the side surface of the core 11 that is not covered with the intermediate-refractive-index resin part 14 needs only be covered by a gas or some other resin part each of which is lower in refractive index than the core 11.

(b) of FIG. 7 shows a partial longitudinal cross-sectional view (left) and a transverse cross-sectional view (right), each illustrating another variation of the optical fiber 1 in accordance with Embodiment 1. The transverse cross-sectional view is taken along line αα in the partial longitudinal cross-sectional view. As illustrated in (b) of FIG. 7, according to the optical fiber 1 in accordance with this variation, the intermediate-refractive-index resin part 14 is absent in the range of ±45° from the top of the core 11. That is, the side surface of the core 11, in every transverse cross section in the coating-removed section I0, is covered with the intermediate-refractive-index resin part 14 only from some directions (±135° from the bottom of the core 11) in that transverse cross section. In the coating-removed section I0, a portion of the side surface of the core 11 that is not covered with the intermediate-refractive-index resin part 14 needs only be covered by a gas or some other resin part each of which is lower in refractive index than the core 11.

(c) of FIG. 7 shows a partial longitudinal cross-sectional view (top) and transverse cross-sectional views (bottom), each illustrating a further variation of the optical fiber 1 in accordance with Embodiment 1. The transverse cross-sectional views are taken along line αα, line ββ, line γγ, line δδ, and line εε in the partial longitudinal cross-sectional view, respectively. As illustrated in (c) of FIG. 7, the optical fiber 1 in accordance with this variation is such that the intermediate-refractive-index resin part 14 is (i) absent in a section I01 at the bottom side of the core 11 and (ii) absent in a section I02 at the top side of the core 11. That is, the side surface of the core 11, only in some transverse cross sections in the coating-removed section I0 (i.e., only in each transverse cross section in the sections I01 and I02), is covered with the intermediate-refractive-index resin part 14 only from some directions in that transverse cross section. In the coating-removed section I0, a portion of the side surface of the core 11 that is not covered with the intermediate-refractive-index resin part 14 needs only be covered by a gas or some other resin part each of which is lower in refractive index than the core 11.

Note that the optical fiber 2 in accordance with Embodiment 2 can also be modified in a similar manner. Specifically, the following arrangement may be employed: the side surface of the inner cladding 21 is covered with the intermediate-refractive-index resin part 24 only in some transverse cross sections in the coating-removed section I0. Alternatively, the following arrangement may be employed: the side surface of the inner cladding 21 is covered with the intermediate-refractive-index resin part 24 from only some directions in a transverse cross section.

[Examples of Application]

Lastly, the following description will discuss examples of application of the optical fibers 1 and 2 in accordance with Embodiments 1 and 2, with reference to FIG. 8. FIG. 8 schematically illustrates a configuration of a fiber laser FL.

The fiber laser FL is a laser device including, as a resonator, a pump-gain fiber PGF that has fiber Bragg gratings FBG1 and FBG2 connected to the opposite ends thereof. The fiber Bragg grating FBG1, which is on the forward side, is an optical fiber having a grating formed therein which serves as a mirror. The fiber Bragg grating FBG2, which is on the backward side, is an optical fiber having a grating formed therein which serves as a half mirror. The pump-gain fiber PGF used here is a double-clad fiber whose core is doped with a rare-earth element such as Yb. By introducing pump light into a cladding of the pump-gain fiber PGF, it is possible to allow this resonator to oscillate laser light.

In the fiber laser FL, laser diodes LD11 to LD16 and laser diodes LD21 to LD26 are used to generate the pump light. Furthermore, in the fiber laser FL, pump combiners PC1 and PC2 are used to introduce, into the cladding of the pump-gain fiber PGF, the pump light generated by the laser diodes LD11 to LD16 and the laser diodes LD21 to LD26. Each of the pump combiners PC1 and PC2 is an optical component that includes a plurality of input lead fibers and a single output lead fiber. Each of the pump combiners PC1 and PC2 serves to combine lights introduced thereto via the respective input optical fibers and to send out the combined light via the output lead fiber.

The input lead fibers of the pump combiner PC1 are connected to the laser diodes LD1$i$ via pump fibers PF1$i$ (i is 1 to 6). The output lead fiber of the pump combiner PC1 is connected to one end of the pump-gain fiber PGF via the fiber Bragg grating FBG1. Pump lights generated by the laser diodes LD11 to LD16 are combined by the pump combiner PC1, and the combined light, as forward pump light, is introduced to the cladding of the pump-gain fiber PGF. Similarly, the input lead fibers of the pump combiner PC2 are connected to the laser diodes LD2$j$ via pump fibers PF2$j$ (j is 1 to 6). The output lead fiber of the pump combiner PC2 is connected to the other end of the pump-gain fiber PGF via the fiber Bragg grating FBG2. Pump lights generated by the laser diodes LD21 to LD26 are combined by the pump combiner PC2, and the combined light, as backward pump light, is introduced to the cladding of the pump-gain fiber PGF. The laser light oscillated in the core of the pump-gain fiber PGF propagates through the core of the fiber Bragg grating FBG2, the core of the output lead fiber of the pump combiner PC2, the core of a delivery fiber port of the pump combiner PC2, and the core of a delivery fiber DF, and then is emitted outward.

In the fiber laser FL, the pump fibers PF11 to PF16, the pump fibers PF21 to PF26, and the input lead fibers of the pump combiners PC1 and PC2 are optical fibers in which the pump light propagates through the cores thereof. It is common to use, as each of these optical fibers, the optical fiber used in Embodiment 1, that is, a single-clad fiber that includes a core made of quartz glass and a primary coating (cladding) made of resin. As such, optical fibers obtained by fusion-splicing the pump fibers PF11 to PF16 with the input lead fibers of the pump combiner PC1, respectively, and optical fibers obtained by fusion-splicing the pump fibers PF21 to PF26 with the input lead fibers of the pump combiner PC2, respectively, are suitable examples of application of the optical fiber 1 in accordance with Embodiment 1 (see FIGS. 1 and 2).

On the other hand, in the fiber laser FL, the output lead fibers of the pump combiners PC1 and PC2, the fiber Bragg gratings FBG1 and FBG2, and the pump-gain fiber PGF are optical fibers in which signal light propagates through the cores thereof and pump light propagates through the claddings thereof. It is common to use, as each of these optical fibers, the optical fiber used in Embodiment 2, that is, a double-clad fiber that includes a core made of quartz glass, a cladding made of quartz glass, and a primary coating made of resin. As such, an optical fiber obtained by fusion-splicing these fibers is a suitable example of application of the optical fiber 2 in accordance with Embodiment 2 (see FIGS. 3 and 4). Furthermore, each of the pump combiners PC1 and PC2 itself is obtained by fusion-splicing the input lead fibers, which are single-clad fibers (or the delivery fiber DF, which is a double-clad fiber), with the output lead fiber, which is a double-clad fiber, and thus is a suitable Example of the present invention. Furthermore, each of the fiber Bragg gratings FBG1 and FBG2 is a double-clad fiber that has a grating formed therein, and thus is a suitable example of application of a variation of the optical fiber 2 in accordance with Embodiment 2 (see FIG. 6).

Note that optical devices to which the optical fibers 1 and 2 in accordance with Embodiments 1 and 2 are applicable are not limited to fiber lasers. For example, an optical combiner is also one example of an optical device to which the optical fibers 1 and 2 in accordance with Embodiments 1 and 2 are applicable.

[Note]

The present invention is not limited to the embodiments, but can be altered by a skilled person in the art within the scope of the claims. The present invention also encompasses, in its technical scope, any embodiment derived by combining technical means disclosed in differing embodiments.

[Recap]

In order to attain the foregoing object, an optical fiber in accordance with the present embodiment includes: an optical waveguide; and a coating that is lower in refractive index than the optical waveguide and that covers a side surface of the optical waveguide except in a coating-removed section, in at least part of the coating-removed section, the side surface of the optical waveguide being covered with a medium that is lower in refractive index than the optical waveguide and that is higher in refractive index than the coating.

According to the above arrangement, it is possible to prevent or reduce light leakage from the optical waveguide which would occur in a coated section that borders on the coating-removed section and that is closer to the light-exit end than the coating-removed section. This makes it possible to provide an optical fiber that is more reliable than conventional optical fibers.

The above optical fiber may be arranged such that (1) the side surface of the optical waveguide, in every transverse cross section in the coating-removed section, is covered with the medium from all directions in the every transverse cross section, (2) the side surface of the optical waveguide, only in some transverse cross sections in the coating-removed section, is covered with the medium from all or some directions in each of the some transverse cross sections, or (3) the side surface of the optical waveguide, in all or some transverse cross sections in the coating-removed section, is covered with the medium only from some directions in each of the all or some transverse cross sections. According to each of the above arrangements, it is possible to provide an optical fiber that is more reliable than conventional optical fibers.

The optical fiber in accordance with the present embodiment is preferably arranged such that: the coating-removed section borders on two sections, one of which is a first coated section in which the side surface of the optical waveguide is covered with the coating; and the medium has a refractive index set such that an NA of the optical waveguide in the coating-removed section is not less than the minimum value of an NA of the optical waveguide in the first coated section.

According to the above arrangement, it is possible to prevent or reduce light leakage from the optical waveguide that would occur in the coating-removed section.

The optical fiber in accordance with the present embodiment is preferably arranged such that the refractive index of the medium is set such that the NA of the optical waveguide in the coating-removed section is not less than NA1min, the NA1min being defined by the following equations (1) to (3):

$$\cos(\theta_{bend}) = 1 - \frac{D}{R} \quad (1)$$

$$n_1 \sin(\theta_{cmax}) = \sqrt{n_1^2 - n_2^2} \quad (2)$$

$$NA1_{min} = n_1 \sin(\theta_{cmax} - \theta_{bend}) \quad (3)$$

where D represents a diameter of the optical waveguide, R represents a minimum bend radius in the first coated section, n1 represents a refractive index of the optical waveguide, and n2 represents a refractive index of the coating.

According to the above arrangement, it is possible to prevent or reduce light leakage from the optical waveguide that would occur in the coating-removed section, merely by bending the optical fiber in the first coated section such that the above conditions are satisfied.

The optical fiber in accordance with the present embodiment is preferably arranged such that the medium is transparent at a wavelength of light guided through the optical waveguide.

According to the above arrangement, it is possible to prevent or reduce the optical loss that would result from the absorption, by the medium, of light that is distributed in the periphery of the optical waveguide in the coating-removed section. It is also possible, even if light leakage from the optical waveguide occurs in the coating-removed section, to prevent the medium from absorbing the leaked light and generating heat.

The optical fiber in accordance with the present embodiment is preferably arranged such that the medium is a resin part that is lower in refractive index than the optical waveguide and that is higher in refractive index than the coating.

According to the above arrangement, it is not only possible to achieve the foregoing optical effects but also possible to obtain a mechanical effect that the coating-removed section of the optical fiber is reinforced.

The optical fiber in accordance with the present embodiment may be (i) a single-clad fiber that includes: a core made of quartz glass and serving as the optical waveguide; and a primary coating made of resin and serving as the coating or (ii) a double-clad fiber that includes: a core made of quartz glass; an inner cladding made of quartz glass and serving as the optical waveguide; and an outer cladding made of resin and serving as the coating.

According to any of the above arrangements, the foregoing effects are obtained.

The optical fiber in accordance with the present embodiment may be arranged such that the optical waveguide contains a fusion splice point or that the optical waveguide has a grating formed therein.

According to any of the above arrangements, the foregoing effects are obtained.

A fiber laser including any of the foregoing optical fibers also falls within the scope of the present embodiment.

A fiber laser including any of the foregoing optical fibers also provides similar effects to the foregoing optical fiber.

REFERENCE SIGNS LIST 1 optical fiber
11 core (optical waveguide)
12 primary coating (coating)
13 secondary coating
14 intermediate-refractive-index resin part (medium, resin part)
P1 fusion splice point
G1 grating
2 optical fiber
20 core
21 inner cladding (optical waveguide)
22 outer cladding (coating)
23 outer jacket
24 intermediate-refractive-index resin part (medium, resin part)
P2 fusion splice point
G2 grating
I0 coating-removed section
I1 first coated section
I2 second coated section

The invention claimed is:

1. An optical fiber comprising:
an optical waveguide; and
a coating that is lower in refractive index than the optical waveguide and that covers a side surface of the optical waveguide except in a coating-removed section,
in at least part of the coating-removed section, the side surface of the optical waveguide being covered with a medium that is lower in refractive index than the optical waveguide and that is higher in refractive index than the coating,
wherein:
the coating-removed section borders on two sections, one of which is a first coated section in which the side surface of the optical waveguide is covered with the coating; and
the medium has a refractive index set such that an NA of the optical waveguide in the coating-removed section is not less than the minimum value of an NA of the optical waveguide in the first coated section.

2. The optical fiber according to claim 1, wherein the side surface of the optical waveguide, in every transverse cross section in the coating-removed section, is covered with the medium from all directions in the every transverse cross section.

3. The optical fiber according to claim 1, wherein the side surface of the optical waveguide, only in some transverse cross sections in the coating-removed section, is covered with the medium from at least some directions in each of the some transverse cross sections.

4. The optical fiber according to claim 1, wherein the side surface of the optical waveguide, in at least some transverse cross sections in the coating-removed section, is covered with the medium only from some directions in each of the some transverse cross sections.

5. The optical fiber according to claim 1, wherein the refractive index of the medium is set such that the NA of the optical waveguide in the coating-removed section is not less than NA1min, the NA1min being defined by the following equations (1) to (3):

$$\cos(\theta_{bend}) = 1 - \frac{D}{R} \quad (1)$$

$$n_1 \sin(\theta_{cmax}) = \sqrt{n_1^2 - n_2^2} \quad (2)$$

$$NA1_{min} = n_1 \sin(\theta_{cmax} - \theta_{bend}) \quad (3)$$

where D represents a diameter of the optical waveguide, R represents a minimum bend radius in the first coated section, n1 represents a refractive index of the optical waveguide, and n2 represents a refractive index of the coating.

6. The optical fiber according to claim 1, wherein the medium is transparent at a wavelength of light guided through the optical waveguide.

7. The optical fiber according to claim 1, wherein the medium is a resin part that is lower in refractive index than the optical waveguide and that is higher in refractive index than the coating.

8. The optical fiber according to claim 1, wherein the optical fiber is a single-clad fiber that includes: a core made of quartz glass and serving as the optical waveguide; and a primary coating made of resin and serving as the coating.

9. The optical fiber according to claim 1, wherein the optical fiber is a double-clad fiber that includes: a core made of quartz glass; an inner cladding made of quartz glass and serving as the optical waveguide; and an outer cladding made of resin and serving as the coating.

10. The optical fiber according to claim 1, wherein the optical waveguide contains a fusion splice point that is located within the coating-removed section.

11. The optical fiber according to claim 1, wherein the optical fiber has a grating formed in the coating-removed section.

12. A fiber laser comprising: a pump-gain fiber;
a pump combiner configured to introduce pump light into the pump-gain fiber; and
a pump fiber disposed between an input lead fiber of the pump combiner and a pump light source,
wherein the input lead fiber and the pump fiber are fusion-spliced to form an optical fiber, the optical fiber being the optical fiber recited in claim 1.

13. A fiber laser comprising:
a pump-gain fiber;
a pump combiner configured to introduce pump light into the pump-gain fiber; and
a fiber Bragg grating disposed between an output lead fiber of the pump combiner and the pump-gain fiber,
wherein the output lead fiber and the fiber Bragg grating are fusion-spliced to form an optical fiber, the optical fiber being the optical fiber recited in claim 1.

14. A fiber laser comprising:
a pump-gain fiber; and
a pump combiner configured to introduce pump light into the pump-gain fiber,
wherein the pump combiner is the optical fiber recited in claim 1.

15. A fiber laser comprising:
a pump-gain fiber; and
a fiber Bragg grating connected to an end of the pump-gain fiber,
wherein
the fiber Bragg grating is the optical fiber recited in claim 1 or
the pump-gain fiber and the fiber Bragg grating are fusion-spliced to form an optical fiber, the optical fiber being the optical fiber recited in claim 1.

16. An optical fiber comprising:
an optical waveguide; and
a coating that is lower in refractive index than the optical waveguide and that covers a side surface of the optical waveguide except in a coating-removed section,
in at least part of the coating-removed section, the side surface of the optical waveguide being covered with a medium that is lower in refractive index than the optical waveguide and that is higher in refractive index than the coating,
wherein the side surface of the optical waveguide, in every transverse cross section in the coating-removed section, is covered with the medium from all directions in the every transverse cross section.

17. An optical fiber comprising:
an optical waveguide; and
a coating that is lower in refractive index than the optical waveguide and that covers a side surface of the optical waveguide except in a coating-removed section,
in at least part of the coating-removed section, the side surface of the optical waveguide being covered with a medium that is lower in refractive index than the optical waveguide and that is higher in refractive index than the coating,
wherein the medium is transparent at a wavelength of light guided through the optical waveguide.

* * * * *